(12) United States Patent
Av et al.

(10) Patent No.: US 12,277,033 B2
(45) Date of Patent: Apr. 15, 2025

(54) SYSTEM AND METHOD TO AUTOMATICALLY MODIFY BACKUP SCHEDULES BASED ON DATA CHANGE RATES

(71) Applicant: Dell Products L.P., Round Rock, TX (US)

(72) Inventors: Mahesh Reddy Av, Bangalore (IN); Avinash Kumar, Patna (IN); Terry O'Callaghan, Hopkinton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/353,868

(22) Filed: Jul. 17, 2023

(65) Prior Publication Data

US 2025/0028604 A1    Jan. 23, 2025

(51) Int. Cl.
*G06F 11/14*    (2006.01)

(52) U.S. Cl.
CPC ...... *G06F 11/1461* (2013.01); *G06F 11/1453* (2013.01)

(58) Field of Classification Search
CPC ............. G06F 11/1453; G06F 11/1458; G06F 11/1461

USPC ......................................................... 711/162
See application file for complete search history.

(56) References Cited

U.S. PATENT DOCUMENTS

| | | | |
|---|---|---|---|
| 9,880,776 B1 * | 1/2018 | Tsaur | G06F 3/067 |
| 2013/0046944 A1 * | 2/2013 | Domyo | G06F 11/1453 711/E12.103 |
| 2020/0042400 A1 * | 2/2020 | Ashokkumar | H04L 67/1036 |
| 2021/0064479 A1 * | 3/2021 | Kumar | G06F 9/45558 |
| 2022/0334722 A1 * | 10/2022 | Shankar D H | G06F 3/067 |

\* cited by examiner

*Primary Examiner* — Than Nguyen
(74) *Attorney, Agent, or Firm* — Staniford Tomita LLP

(57) ABSTRACT

A policy level controller coordinates a scheduling and policy engine using a data change metric to dynamically schedule or re-define policies in response to data change rates in data assets in a current backup session. A supervised learning process trains a model using historical data of backup operations of the system to establish past data change metrics for corresponding backups processing the saveset, and modifies policies dictating the backup schedule by determining a data change rate of received data, as expressed as a number of bytes changed per unit of time. In response to input from backup targets regarding present usage, it then modifies the backup schedule to minimize the impact on backup targets that may be at or close to overload conditions.

18 Claims, 5 Drawing Sheets

SYSTEM AND METHOD TO AUTOMATICALLY MODIFY BACKUP SCHEDULES BASED ON DATA CHANGE RATES

TECHNICAL FIELD

Embodiments are generally directed to large-scale backup systems and more specifically to modifying backup schedules and data protection policies using data change rates.

BACKGROUND

Data protection involves backing up data for storage and restoration in case of system failure. Data can be copied or cloned from a data source (backup client) to a storage target through a backup server. With ever increasing amounts of data and the need for scalability in enterprise level data systems, the data to be backed up and restored can vary widely with regards to backup requirements and preferences. In a typical data protection scenario, a backup administrator may define different data protection policies for backup and restore operations, each of which may be suited to a different use case.

Existing scheduling components generally do not consider any sort of data change rate measures to tune themselves, but instead rely only on manual overrides. Due to this, a user may not be able to make certain policy changes at an asset level within the system for a specific period of time. For example, if a backup coordinator is processing several assets of a similar data type, but some of the assets take much longer than usual to backup as compared to the other assets, then a backup window could be compromised by these assets and thereby threaten the production host activities. In this case, the user typically does not have a choice but to add another scheduled backup or process those assets in a separate backup operation. This type of issue is caused by the fact that schedulers cannot currently modify themselves based on a spike or change in data change rates of individual assets. This causes disruption of backup schedules and forces management intervention as data overhead increases within backup cycles.

What is needed, therefore, is a system and method that uses a data change measure as a parameter to help schedule backups and modify policies in data protection systems.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Data Domain, Data Domain Restorer, and PowerProtect are trademarks of DellEMC Inc.

BRIEF SUMMARY OF EMBODIMENTS

Embodiments are directed to a data protection system that utilizes certain supervised learning classification processes using data change measures to modify scheduling and policies in a data protection system. Such embodiments overcome the issues associated with present policy engines that cannot automatically and seamlessly accommodate changing data loads in data assets during a backup period, and that require manually overriding or rescheduling backup jobs to prevent overloading backup targets.

A policy level controller coordinates a scheduling and policy engine using a data change metric to dynamically schedule or re-define policies in response to data change rates in data assets in a current backup session. A supervised learning process trains a model using historical data of backup operations of the system to establish past data change metrics for corresponding backups processing the saveset, and modifies policies dictating the backup schedule by determining a data change rate of received data, as expressed as a number of bytes changed per unit of time. In response to input from backup targets regarding present usage, it then modifies the backup schedule to minimize the impact on backup targets that may be at or close to overload conditions.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
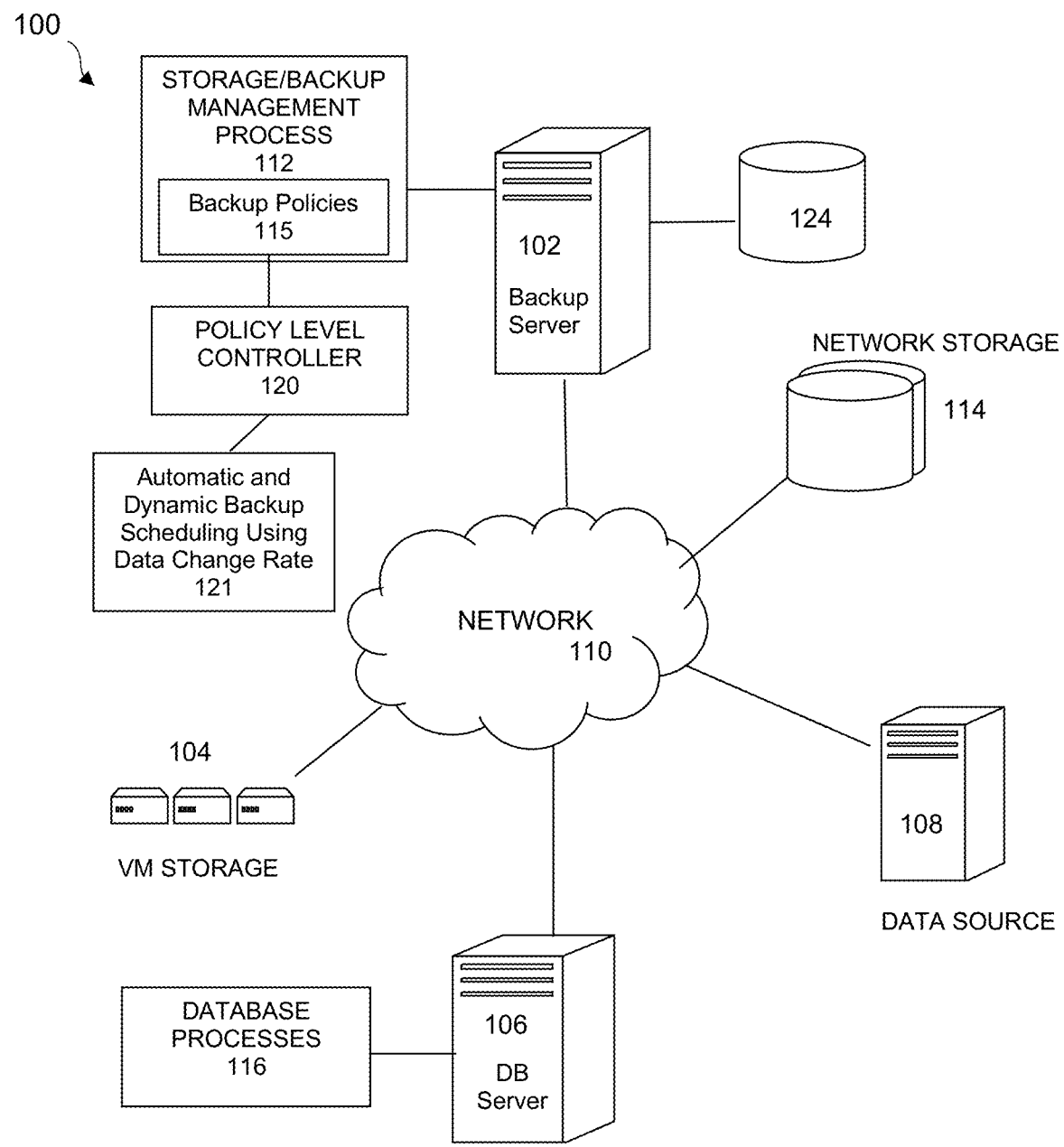
FIG. 1 illustrates a computer network system that implements one or more embodiments of a backup system using supervised learning to implement dynamic backup scheduling using data change metrics.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. In this specification, implementations, or any other form that the invention may take, may be referred to as techniques. In general, the order of the steps of disclosed processes may be altered within the scope of the invention.

Some embodiments of the invention certain computer network techniques deployment in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Data protection systems involve backing up data at regular intervals for restoration, replication, or data move operations based on user need and/or data corruption events. To reduce the sheer amount of data that is backed up and stored, such systems typically use some form of deduplication to eliminate redundant copies of data, such as might be present with data that is frequently backed up, but not as frequently changed in between each backup period.

The Data Domain File System (DDFS) is an example of one such deduplication file system. As the data is ingested, the filesystem anchors and segments the data. The filesystem keeps track of segments which are stored on the disk, and if the segments were to be seen again, the filesystem would just store the reference to the original data segment which was written to disk. Deduplication backups often involve periodic full backups of backup clients by the backup server followed by one or more incremental backups that backup only that data that has changed from a last full backup. Because of the sheer number of backup clients and the amount of data in a large scale data processing system, such backups can be very time and processor intensive.

In order to provide appropriate backup protection to users, data protection vendors often implement certain service level agreements (SLAs) and/or service level objectives (SLOs) to define and quantify certain minimum requirements with regard to backup performance. These parameters usually define characteristics such as maximum backup time per session, minimum data throughput rates, maximum data restore times, data storage terms, and so on. The vendor and/or user is allowed to define policies that control backup operations, such as backup schedules, identity and priority of backup clients and storage targets, backup data types, and so on, and such policies are usually written so that the SLA and SLO requirements are met. However, the dynamic and changing nature of different clients and data types in a backup dataset means that these policies must be similarly adaptable and dynamic to accommodate such changes.

Data protection operations are usually controlled by policies that routinely perform backups according to defined schedules that specify which data assets are stored to specific storage targets and when. Changing data asset conditions, however, may interrupt usually scheduled backups, such as if a data source or asset experiences a significant change in data amounts or change rates. In this case, the backups may need to be modified to ensure that overall backup operations are not unduly affected. Embodiments include a data protection process that dynamically reschedules backups in the event of changes in data rates of assets being backed up.

FIG. 1 illustrates a computer network system that implements one or more embodiments of a backup system using data change metrics to dynamically adjust backup schedules and polices. In system 100 of FIG. 1, a storage server 102 executes a data storage or backup management process (or "backup program") 112 that coordinates or manages the backup of data from one or more data sources 108 to storage devices, such as network storage 114, client storage, and/or virtual storage devices 104. With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources, such as storage server 102 or data source 108, in the network environment. The data sourced by the data source (serving as a 'backup client') may be any appropriate data, such as database data that is part of a database management system, and the data may reside on one or more hard drives for the database(s) in a variety of formats. Thus, a data source maybe a database server 106 executing one or more database processes 116, or it may be any other sources data for use by the resources of network 100.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays, such as RAID (redundant array of individual disk) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

As shown in FIG. 1, the backup management process 112 implements certain backup policies 115. These policies are defined by the user or system administrator and specify various operational parameters of the backup jobs. For example, policies dictate which data clients or data assets are backed to which storage targets, how often the backups are made, and any special processing, such as encryption, and so on. Many different policies may be defined for the various data sources, assets, and storage targets in the system. For example, one policy may specify that critical or confidential data is stored frequently on high performance storage, such as solid state disk (SSD) or local hard disk drive (HDD) storage, while another policy may specify that routine or older data is stored periodically on cloud or archive tape storage, and so on.

Policies are usually written statically in terms of assigning certain data sources or assets to specific storage targets according to a set schedule based on an assumption that the type, amount, and change rate of such data remains approximately the same over multiple backup periods. That is, it is usually presumed that routine data is generated in a certain amount at a certain rate appropriate for periodic storage in long-term storage targets, and that critical data is typically of a lesser amount and can be stored more frequently in higher performance (and higher cost) storage devices. However, any significant change in data amounts and change rates may disrupt backup schedules, such as if a large amount of routine data is generated to the extent that it delays or interrupts its own or other backup schedules, such as if it consumes network bandwidth and prevents a backup cycle for a critical dataset.

Embodiments of system 100 include a policy level controller (PLC) 120 that manages storage targets (e.g., Data Domain appliances) and their attributes for best usage as storage resources. In an embodiment, the PLC 120 presents a storage resource as an usable unit to the backup management process 120, enabling it to define various operational parameters. These can include storage unit types, storage unit names, quotas, limits (hard/soft), authentication credentials, tokens, security, and so on. The PLC 120 can also interface to a user through a graphical user interface (GUI) to allow the user to explicitly associate storage resources to the devices controlled by the PLC. In this manner, the user can dictate that a particular set of assets use a precise set of storage to achieve certain protection goals.

As shown in FIG. 1, system 100 includes an automatic backup scheduler 121 that prioritizes, re-sizes, and/or reschedules data assets from the PLC for data transfer to the target storage to ensure that load at the target is balanced against spikes in demand from other data assets. The scheduler 121 does this by looking at the data change rates of the backup datasets generated by the backup clients (hosts) using the backup server.

Figure 2:
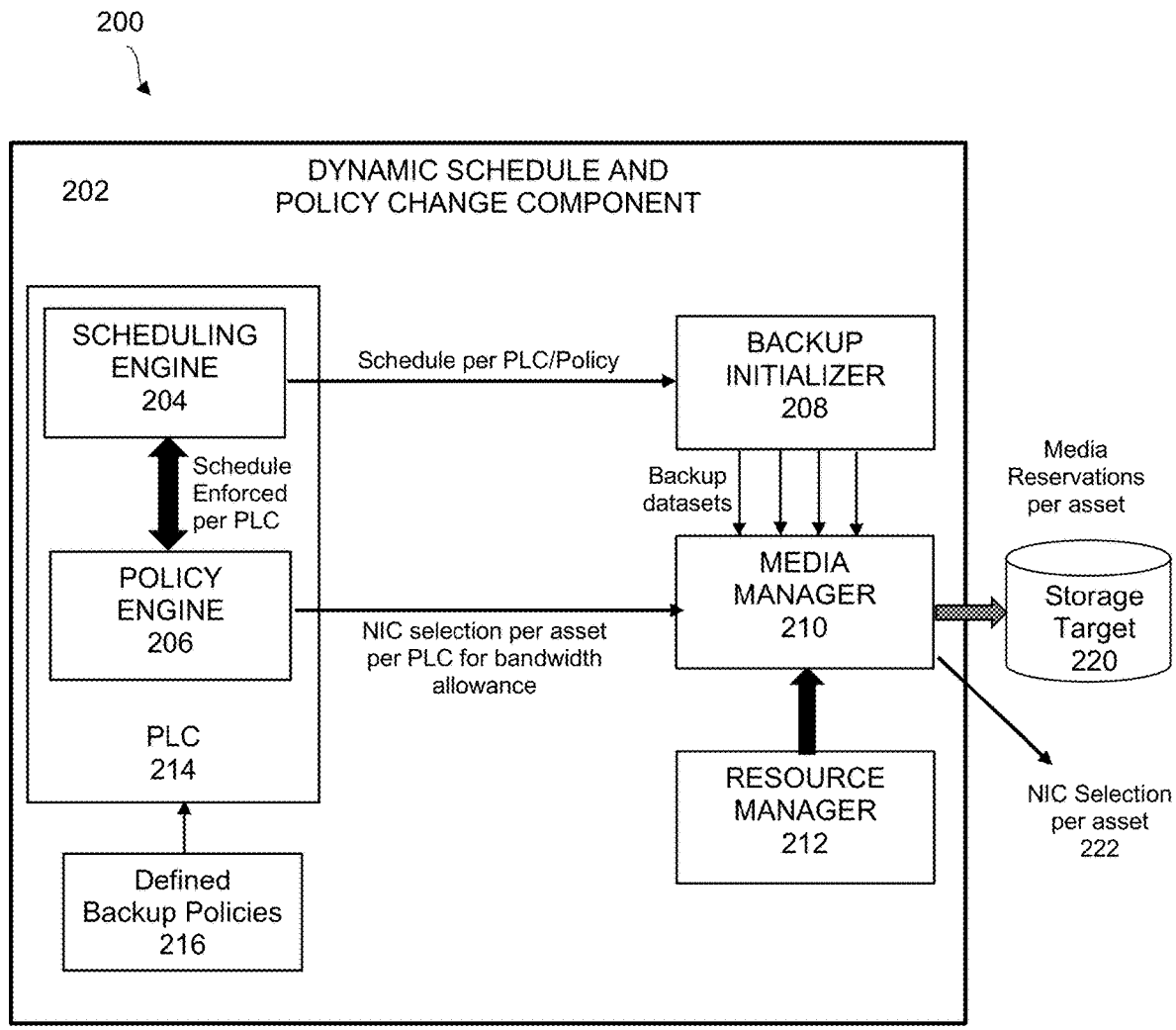
FIG. 2 is a block diagram illustrating an automatic backup scheduler component 202, under some embodiments.

FIG. 2 is a block diagram illustrating an automatic backup scheduler component, under some embodiments. As shown in FIG. 2, system 200 includes an automatic schedule and policy change component 201 that has a PLC 214 that comprises a policy engine 206 and scheduling engine 204. Policy engine 206 processes policies as they are written by users or administrator, where policies dictate backup schedules for various assets and appropriate target storage, along with any special handling instructions, such as encryption, access controls (e.g., RBAC), and so on. The policy engine 206 works with the scheduling engine to send backup jobs to a backup initializer. For the embodiment shown, defined policies are enforced by the PLC 214, and may consist of externally written policies or policies included in the PLC.

In general, PLC 214 acts as interactive interface to the user. Its policy engine 206 and scheduling engine 204 work in conjunction to facilitate the data protection for system 200. The scheduling engine 204 monitors and performs the job queuing from the assets included in the PLC. The scheduling engine tries to ensure a smooth allotment of backup jobs to the backup engine to get them serviced accordingly. The policy engine 206 records and processes the assets and their related details in relation to the assets in the PLC. For example, the policy engine would have the pool details, asset details, agent details, application assignments, and so on. The scheduling engine 204 has the jobs to be serviced per PLC, which could be discovery jobs from PLC, backup jobs from the PLC, deletion jobs from the PLC, and so on. The policy engine is the component that communicates the details to the scheduling engine from the PLC in an understandable format for scheduling.

The backup initializer 208 sends the backup datasets (assets) to a media manager 210, which is controlled by a resource manager 212, and reserves appropriate media storage for each asset. The resource manager 212 allocates network addresses and CPU resources for parallel processing streams. The network addresses typically comprise network interface device (NIC) port addresses, where a NIC is a hardware component that connects a device to the network. As stated above, the policy engine and scheduling engine work together to allocate the necessary resources for the triggered jobs. For example, the policy engine would be aware of the NIC and CPU availability for the PLC allocation, and the scheduling engine 204 would then handoff the relevant jobs with the NIC and CPU details to the next consecutive steps.

With a typical NIC interface architecture, the user could have multiple interfaces for backup and restores that are exclusively separate from the production networks, and these are serviced by different NIC ports or addresses. In this case, these NIC addresses are selected by the policy engine as per the user selection in the PLC. For example, a VM data type could have a NIC with 1 Gigabyte/second, whereas a file system data type might have a NIC with 2 Gbps. These two NIC's can then be selected for multiple similar form of assets. The PLC 214 thus sends a NIC selection per asset per PLC for bandwidth allowances to the media manager 210, and The media manager 210 then sends the backup data to the appropriate storage target 220.

In an embodiment, the scheduling engine 204, in conjunction with the policy engine 206 prioritizes only smaller datasets from the PLC 214 for the data transfer to the storage target device 220 in order to ensure the load at target is minimal until any additional data from other PLC's are serviced and any actual or potential spikes in data processing and storage reduced. The threshold size of the datasets defining datasets that are so transferred can be set by the system or user, and is selected based on one or more factors, such as average dataset size, data generation rates, network throughput, device speed/capacity, and so on. In present systems, typical example dataset sizes would be on the order of less than 1 GB of data, and the threshold would thus be selected per this size. Thus, smaller datasets comprise datasets that are of a size less than 1 GB. This is provided for illustration only, and other dataset sizes and threshold values can also be used.

Figure 3:
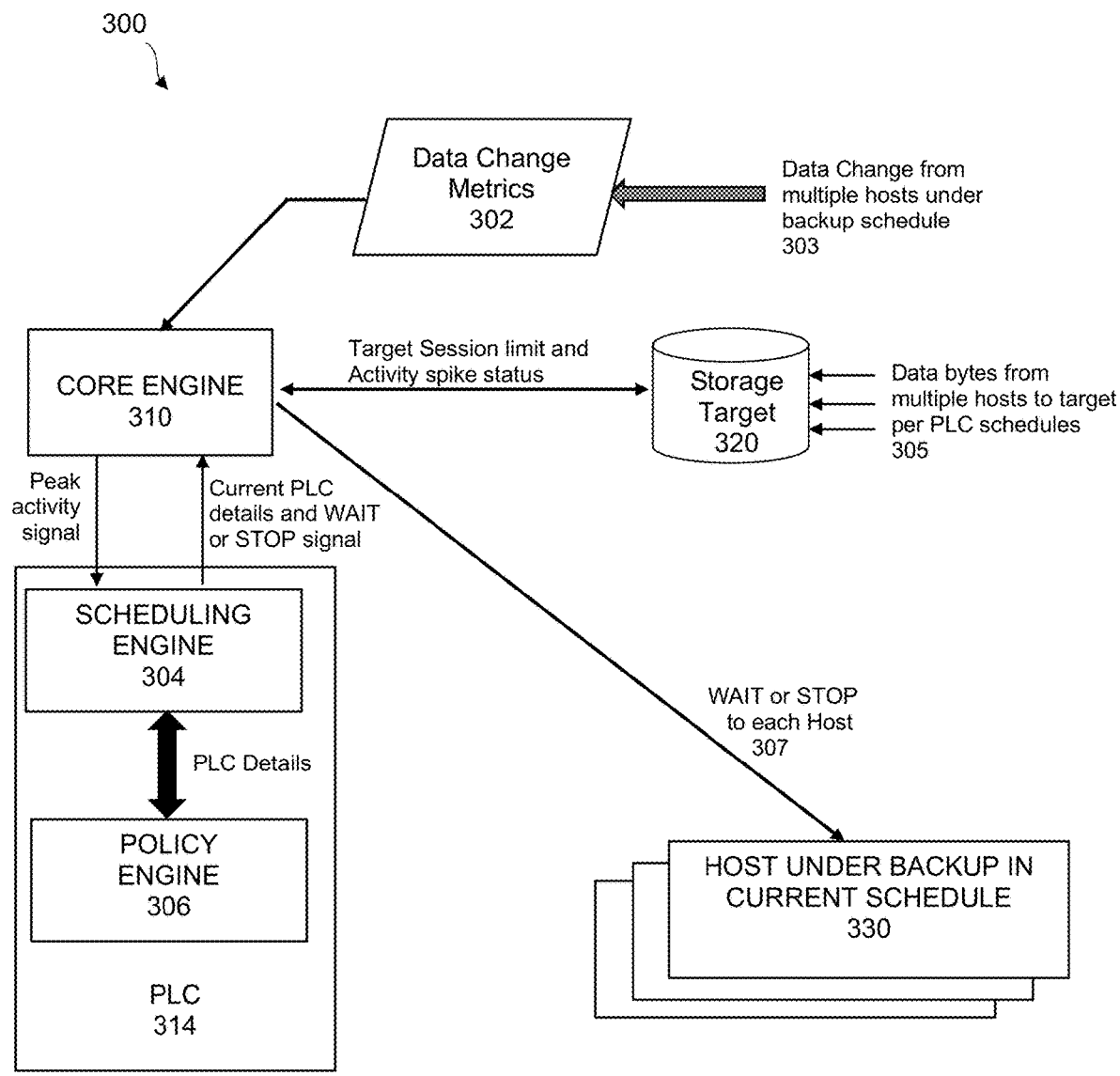
FIG. 3 is a block and flow diagram illustrating operation of an automatic schedule and policy change component, under some embodiments.

FIG. 3 is a block and flow diagram illustrating operation of an automatic schedule and policy change component, under some embodiments. As shown in FIG. 3, system 300 includes a number of hosts (backup clients) each generating data assets to be stored in storage target 320 during a current backup schedule. The hosts and their respective assets may exhibit different data change rates 303 that are quantified in respective data change metrics 302. The data change rate is expressed as a change in an amount of data (e.g., in bytes) per unit time (e.g., in seconds), and this rate may be scaled (e.g., kB/second) to any appropriate range based upon system configuration.

Policies dictating the data transfers from the hosts to the storage are defined by a PLC 314 through a policy engine 306 to the scheduler 304. The asset backup operations are dynamically scheduled by this combination of components using data change rates for the assets and/or the hosts.

The data change metrics from the hosts are sent to a core engine 310, which generates a peak activity signal. The scheduling engine 304 fetches this peak activity signal from the core engine and uses this signal to send a WAIT or STOP signal to the job queue in the core engine 310. The WAIT or STOP signal can be triggered by monitoring the activity spike status and target session limit signals from the storage target 320 itself. The target may send a signal indicating that it has reached a limit for a backup session or that an overload condition has occurred or is about to occur. This information is then associated with the currently serviced PLC details by the scheduling engine 304.

Overload conditions may be defined based on the configuration and operating conditions of the system, but generally include too much data, too many service requests for backup, too many backup jobs, or too many I/O operations trying to spike the CPU performance.

A WAIT or STOP signal thus indicates that the storage target 320 is being overloaded (i.e., generates a spike condition), so either the data transfer from the current PLC 314 should completely wait or only those data sets with the least data change should be transferred until the overload is reduced. This signal is passed to the host or hosts that need to suspend any current data transfer. The core engine 310 acts as a facilitator to route the appropriate signal calls 307 to the backup agent on each host under backup in the instantaneous backup schedule ready to be initiated.

The storage target 320 then receives the data assets from the multiple hosts per the schedule as modified by the scheduling engine 310 and core engine 304 to limit the effect of any overload condition presented to the storage target 320.

The hosts or backup clients 330 in FIG. 3 may represent any type of computer or device generating different data objects at different times to be included in one or more data savesets. Such devices can range from computers, laptops, mobile devices, network devices, servers, and so on, all backing up data and metadata over network 100 through backup server 102 to various different storage systems 104, 114, 110, etc., using backup program 112 and policies 115. Each client generally represents a device used by a user in a variety of different ways, such as for productivity (e.g., laptop/desktop computers), communications (e.g., mobile phones), applications (e.g., tablet computers), and so on. Other clients may include sensors, IoT (Internet of Things) devices, network interfaces, and other similar devices that generate data. Each client may thus generate different data that maybe subject to different protection policies based on data type, importance, volume, storage requirements, and so on.

In present system, it is common for multiple busy backup clients to overload the target storage with data transfers from multiple PLC's. Such legacy backup applications would continue to send the additional datasets to the target device thus causing a spike in the target's workload, which could ultimately hamper the overall performance during backup transfers. Embodiments of system 300 address this issue by providing a degree of intelligence to the scheduler and core engine to reduce the workload by limiting further data transfers to the target device if there are multiple PLC's being serviced. In this way, if the target's load is high and/or the allowed session limit is neared or reached, further backups defined in the policy are temporarily suspended, rescheduled, or re-routed to eliminate target storage spikes.

In an embodiment, system 300 is configured to leverage the historic data from the previous policy and PLC information regarding the assets, time consumed for successful completion, space utilized on the target, and other similar factors. This historic data, in conjunction with the data change availability per asset, the scheduling engine can be modified to be auto tunable to selectively define certain policies per asset in order to ensure optimized backup operations with respect to properly utilized storage targets. This greatly improves existing schedulers that do not consider any sort of data change measure to tune themselves, but rather work purely on a manual override basis, thus preventing users from affecting certain policy changes at an asset level within a PLC for a specific period of time.

Historic data may show that data manageability overhead increases and redundant PLC related information is generated for a similar policy with similar assets. Hence, to mitigate the problems associated with such cases, information from the measured time window calculation and historic details of the assets and data change metric can be used by the dynamic scheduler process of system 300. For example, the scheduling engine 304 can be configured to automatically work with the policy engine 306 to assign a high bandwidth storage device to certain assets for a specific time period in order to increase the overall performance for the asset on a particular day so as to ensure the backup activities are well within the non-idle times of production host. Similar redirections of backup jobs or data assets within a backup job may also be performed, depending on system configuration and backup job compositions, sizes, and so on.

Figure 4:
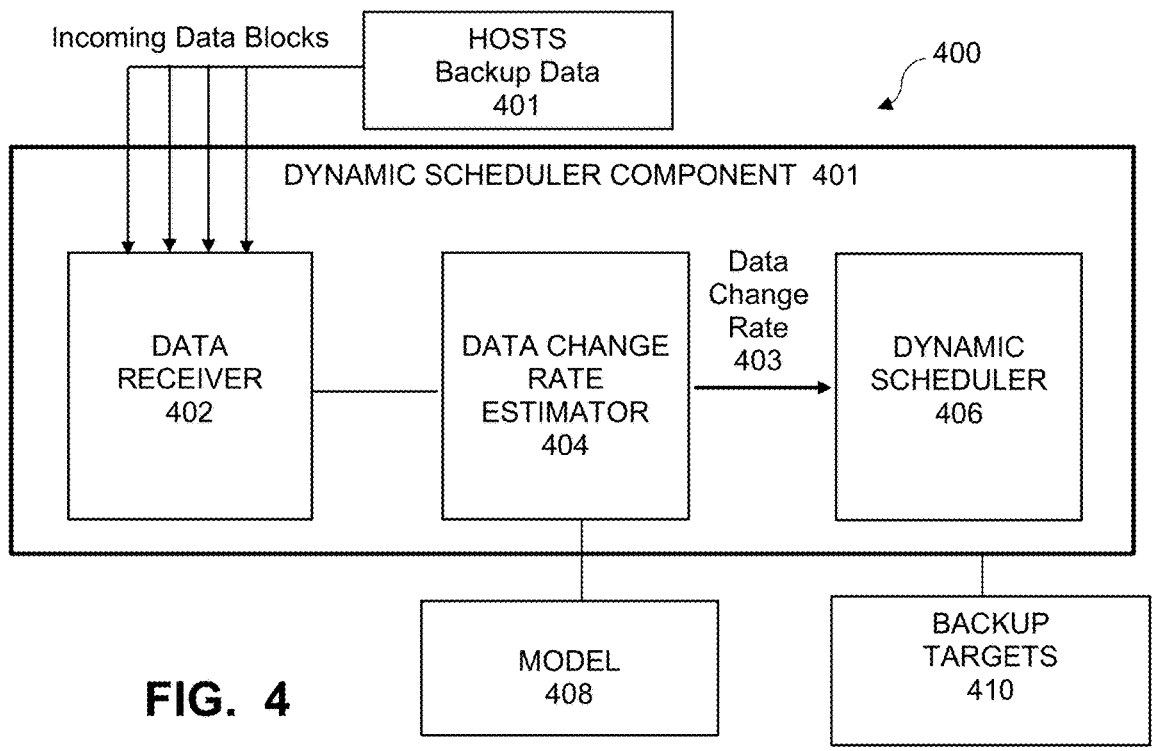
FIG. 4 is a block diagram of a dynamic backup scheduler component using a data change metric and historic data, under some embodiments.

FIG. 4 is a block diagram of a dynamic backup scheduler component using a data change metric and historic data, under some embodiments. As shown in FIG. 4, system 400 includes a dynamic scheduler component 401 that modifies backup policies to change a time or destination of backup operations among backup targets 404.

A data receiver 402 is an interface component that receives incoming data blocks for data that is backed up from one or more hosts 401. The incoming data blocks are analyzed by a data change rate estimator component 404 to determine a current rate of change as compared with historical data provided by a model 408.

In an embodiment, the estimator 404 is an analytical unit using a bit map that is created for the dataset being processed and which is compared with the bit map from the last incremental/full backup to detect the changes in the bit map of the dataset. For example, if there is a volume c: \ being replicated, a bitmap of the drive is fetched from the current time instant and compare it with historical data i.e., the bitmap from the last successful backup or a tuned time interval from the end user input, whichever is earlier. Also, along with the last bit map, any historical data changes from the present asset would be calculated using the model in place. With this comparison, the analytical unit would determine the data changes and parameter changes (e.g., size of changes, data change rate, etc.). The historical data provided by a model is a micro-unit of the estimator 404 that works as an AI-based analytical model to hold the historic bit map data of the data object under consideration. When a model 408 is referenced, it is the estimator in conjunction with the model that is holding the historic bit map data.

Any fitting AI algorithm to detect data changes from historic data or bit maps can be used for this embodiment. The estimation here is a quantifiable metric rather than a quality measure, and is done using the bit map of current time and bit map of the last successful backup in regular interval times historically. The analytical unit has an AI model that is trained with historic data to hold a proper bit map data change that could be potentially used as a reference to compare with the current bit map changes. The historical bit map data would inform only the reference for a bit map change comparison from the past data changes in the data unit.

In an embodiment, system 400 calculates the amount of data that has changed based on historic backup operations to determine a baseline backup cycle. For example, if an organization intends to backup data from a particular host to a particular target every hour, the system will calculate the average data change from previous backups and use that calculation to decide when the next backup cycle should occur.

In general, the estimator 404 does the work of data change estimation, and the system 400 makes the backup decisions regarding storage targets using the data change rates estimated. The estimator has an AI model 408 that is trained with historic data to hold a proper bit map data change that could be potentially used as a reference to compare with the current bit map changes. Historical bit map data would inform only the reference for a bit map change comparison from the past data changes in the data unit, and the estimator then takes care of the calculation.

Using the bitmap of the current time and the bitmap of the last successful backup made during regular time intervals, the estimator component 404 calculates a data change rate metric 403, which is a quantifiable value rather than a qualitative characteristic. This metric is then passed to a dynamic scheduler component 406. For the data change rate, this metric is expressed as a number of bytes changed per unit time (bytes/time), where the time period may be configured based on system configuration and needs. For example, if the data change rate calculation shows that there was a data change of 100 GB per hour, then the data change rate metric 403 would be 100 GB, regardless of when the last backup occurred. This metric is dynamic and may change depending on the organization's data load.

The data change rate metric 403 is provided to a dynamic scheduler 406 that modifies one or more PLC policies that dictate when and how much data is sent to the backup target or targets 410. If it appears that the amount or rate of data sent by the current policy will cause a spike or overload in a data target, the scheduler will effectively modify the policy by delaying or postponing the backup operation, or rerouting the data to a different backup target.

The threshold value or range defining an overload condition may be set by the system, target storage device, or a user depending system configuration and backup operations. These values along with re-scheduling and/or re-routing rules can be stored in a database accessible to the dynamic scheduler 406.

For the embodiment shown in FIG. 4, system 400 makes use of use of historical data from users that train a model 408 to decide the optimum scheduling and targets of backup jobs for datasets from hosts 401. This system makes use of the historical data from the user environments (or laboratory scenarios) to reduce data transmission load to the potentially overloaded targets. The historic bit map is generally accurate and can give a fair idea of the data change estimations, which is then used by the estimator 404 and dynamic scheduler 406 to ultimately select the best backup schedule for the targets, as based on the data change rate of the data savesets. The best schedule is the one prevents overloading of any of the target storage devices 410.

Figure 5:
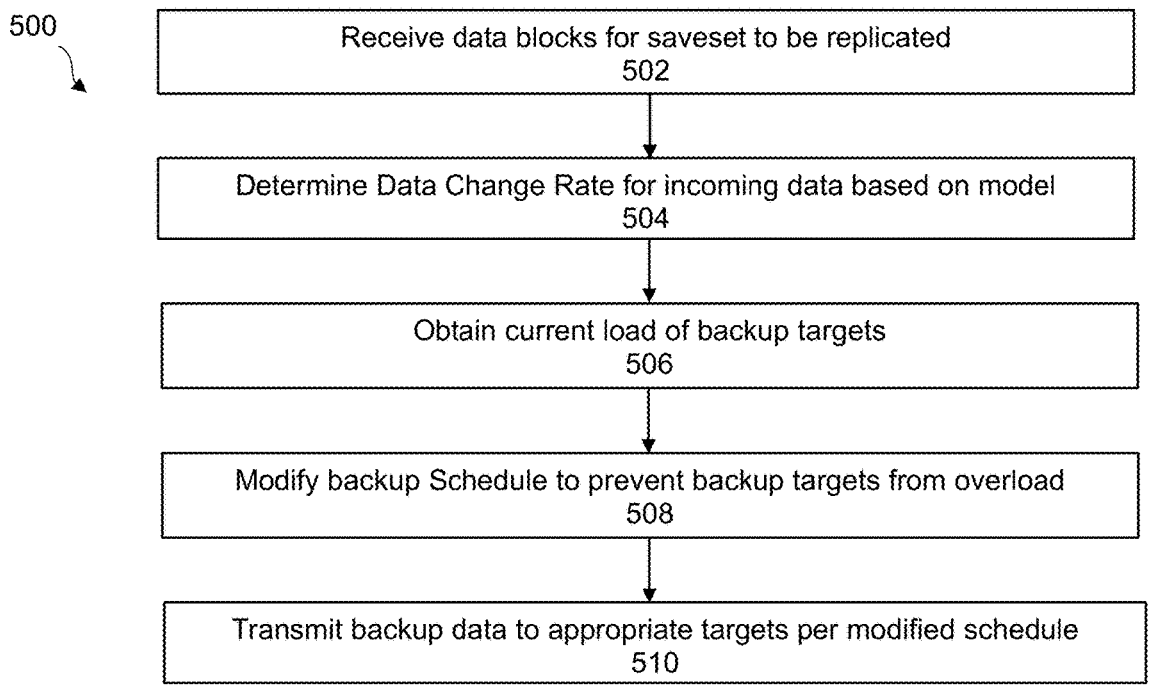
FIG. 5 is a flowchart that illustrates a method of dynamically modifying backup schedules using a data change rate measure, under some embodiments.

As described, the appropriate backup schedule is chosen using a metric embodying the rate of data change of a dataset (or data asset) processed by the backup system 100. The rate of data change of a saveset is measured to drive a metric referred to herein as a "data change measure" or "data change metric." FIG. 5 is a flowchart that illustrates a method of dynamically modifying a backup schedule using a data change rate measure, under some embodiments. As shown in FIG. 5, process 500 starts in step 502 with the receiving of data blocks for data savesets to be backed up. The data may be any appropriate data elements, such as a virtual machine, filesystem, database, document, and so on.

In step 504, the actual data change rate of the incoming data is determined. Alternatively, or in addition, an estimated data change rate from estimator component 404 uses a model 408 can be used to calculate the data change rate 403 of the incoming data. As described above, the model uses a complete or near-complete history of changes to the dataset and derives a bit map change metric as a reference for comparison and estimation. This can provide a better estimation than a straight calculation of data change rate for the present data set, which would only use the current and last bitmap from a last backup.

In step 506, a current load condition of the backup target is obtained, such as through a target session limit or activity spike status signal, as shown in FIG. 3. Based on this load information and the data change rate, the dynamic rescheduler can modify a current backup policy to delay or postpone a current backup session, 508. It may also re-route the data saveset to an alternate storage target. The system can then transmit the backup data to the appropriate targets per the dynamically modified backup schedule.

In an embodiment, certain supervised learning methods can be used to generate or use model 308. As used herein, "supervised learning" refers to a subcategory of machine learning (ML) and artificial intelligence (AI) that is defined by the use of labeled datasets to train algorithms that to classify data or predict or estimate outcomes accurately. In an embodiment, the KNN process is used for the data classification to classify current and new data objects with respect to criticality and backup/restore prioritization within an overall data protection process.

In an embodiment, the dynamic scheduler component 401 utilizes certain artificial intelligence (AI) and machine learning (ML) processes to evaluate new data objects using various attributes, such as data change size, data change rate, bit map count, bit map size etc., to generate the model 308.

Such a process generally uses a training component that continuously trains a machine learning algorithm.

Figure 6:
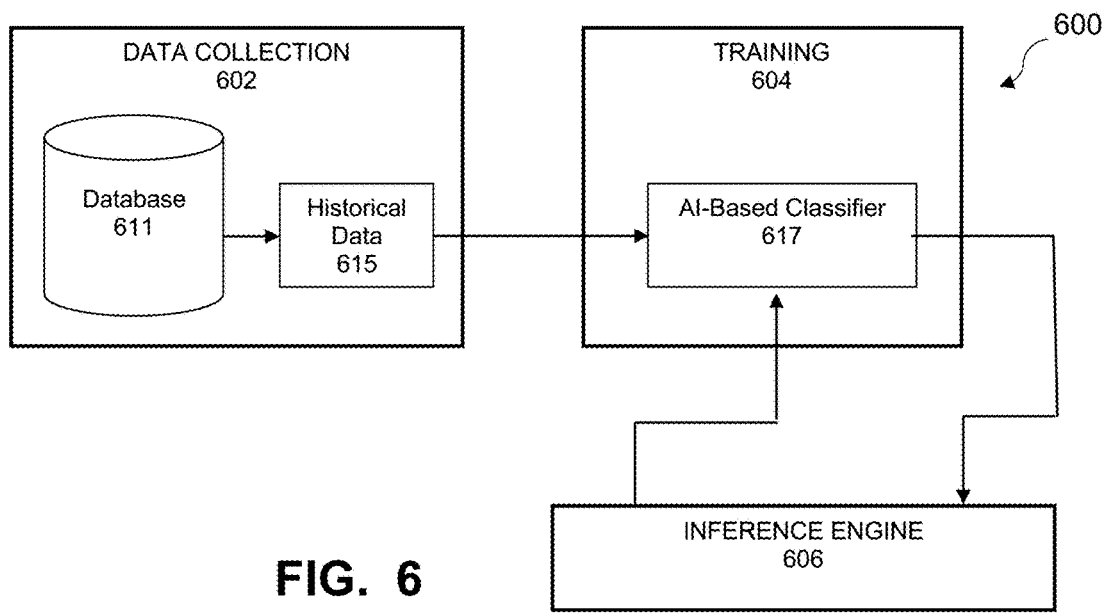
FIG. 6 illustrates a general AI/ML component used in a dynamic backup scheduler component, under some embodiments.

FIG. 6 illustrates a general AI/ML component used in a dynamic rescheduler component, under some embodiments. System 600 of FIG. 6 includes a data collection component 602, a training component 604, and an inference component 606. The data collection component 602 can comprise various data loggers and I/O capture devices and databases 611 along with a body of historical information 615 about past data objects, clients, and events (e.g., backup operations). The data collection component 602 continuously monitors and collects data objects and event data to build up its database. This collected information is submitted to the training component 604 through an AI-based analyzer 617. This component continuously trains a machine learning algorithm to identify the data object attributes to thereby determine a cloning method for the new data object and/or client. The inference engine 606 also continuously trains the AI/ML algorithms through monitored events.

The AI component of system 600 may employ any suitable AI algorithm, such as a fitting algorithm to derive the data change metric. In general, the performance required to handle the vast variation of data source types and huge size of the big data involved, which may be in zeta bytes of range, may be achieved with low latency and high throughput through embodiments described herein. Such AI mechanisms may be scaled and modified for different application needs and system configurations.

Figure 7:
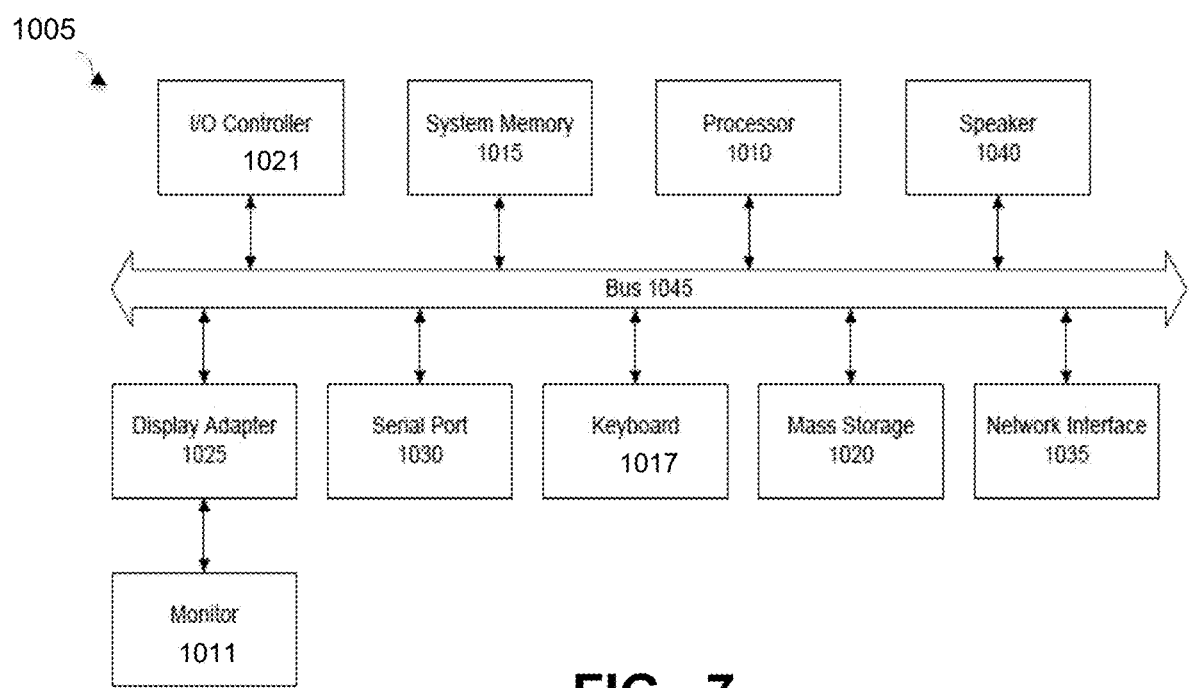
FIG. 7 shows a system block diagram of a computer system used to execute one or more software components of the present system described herein.

The system of FIG. 1 may comprise any number of computers or computing devices in client-server networks including virtual machines coupled over the Internet or similar large-scale network or portion thereof. Each processing device in the network may comprise a computing device capable of executing software code to perform the processing steps described herein. FIG. 7 is a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11.x), near field communication (NFC), radio-frequency identification (RFID), mobile or cellular wireless. For example, signals from a computer may be transferred, at least in part, wirelessly to components or other computers.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of dynamically scheduling backup jobs in a data protection system, the method comprising:
   receiving data from a plurality of backup clients for storage in a storage target in accordance with a defined backup policy;
   determining a respective data change rate of the data from each backup client, as expressed as a number of bytes changed per unit of time, to produce a data change metric;
   generating, in a core engine, a peak activity signal using the data change metric;
   monitoring an activity spike status and target session limit signals from the storage target;
   receiving, from the storage target, an indication of a current load condition of the storage target; and
   using the peak activity signal to generate a signal to redirect transmission of the data to an alternate storage target if the current load condition exceeds a threshold value to prevent an overload of the storage target due to a spike in data change rates for the plurality of backup clients, wherein the alternate storage target that is not presently prone to the overload condition, or that comprises a higher performance or higher availability storage device.

2. The method of claim 1 wherein the backup policy dictates datasets, backup clients, storage targets, special handling requirements, data processing operations, and storage parameters for the backup jobs.

3. The method of claim 1 wherein the overload condition comprises at least one of: an amount of data transmitted to the storage target in excess of its storage capacity, transmission of data at an excessive rate compared to an ingress rate of the storage target, or an excessive number of input/output operations to the storage target.

4. The method of claim 1 wherein the policy is generated by a policy level controller (PLC) that manages storage targets and their attributes for best usage as storage resources in the system, and defines various operational parameters.

5. The method of claim 4 wherein the operational parameters are selected from the group consisting of: storage unit types, storage unit names, quotas, limits (hard/soft), authentication credentials, tokens, and security mechanisms.

6. The method of claim 5 further comprising first delaying the transmission of the backup data to the storage target prior to the redirect to the alternate storage target, and further wherein the PLC communicates with a scheduling engine to control a core engine that provides wait or stop signals to the backup client to delay or suspend the transmission of the backup data.

7. The method of claim 1 wherein the data change metric is a predicted value generated by an estimator component.

8. The method of claim 7 wherein the estimator component uses a comparison of a bitmap of the data with a historic bitmap of data from one or more previous backup operations to produce the predicted value.

9. The method of claim 8 further comprising training a model using historical data of the one or more previous backup operations to establish past data change metrics for corresponding backup operations involving the backup client and the storage target.

10. The method of claim 9 wherein the model utilizes an artificial intelligence (AI) based component comprising a data collection component, a training component, and an inference component, and contains historical information regarding past data objects and clients of the network to continuously train a machine learning (ML) algorithm in a predictive process to identify data object attributes for backing up the data and employ a fitting algorithm to derive a data change metric to determine an optimal backup reschedule to minimize overloading the storage target.

11. The method of claim 1 wherein the network comprises a PowerProtect Data Domain deduplication backup system.

12. A system for dynamically scheduling backup jobs in a data protection network, comprising:
   a hardware-based policy level controller coordinating a scheduling engine and policy engine implementing a policy to backup data from a plurality of backup clients for storage on a storage target;
   a component determining a respective data change rate of data from each backup client, as expressed as a number of bytes changed per unit of time, to produce a data change metric;
   a monitor monitoring an activity spike status and target session limit signals from the storage target;
   a processor-based core engine functionally coupled to the scheduling engine generating a peak activity signal using the data change metric, and further using the peak activity signal to generate a signal to redirect transmission of the data to an alternate storage target if the current load condition exceeds a threshold value to prevent an overload of the storage target due to a spike in data change rates for the plurality of backup clients, wherein the alternate storage target that is not presently prone to the overload condition, or that comprises a higher performance or higher availability storage device.

13. The system of claim 12 wherein the backup policy dictates datasets, backup clients, storage targets, special handling requirements, data processing operations, and storage parameters for the backup jobs.

14. The system of claim 13 wherein the overload condition comprises at least one of: an amount of data transmitted to the storage target in excess of its storage capacity, or transmission of data at an excessive rate compared to an ingress rate of the storage target, and wherein the core engine redefines the policy by first delaying and re-scheduling the current backup session prior to redirecting the data.

15. The system of claim 12 wherein the PLC manages storage targets and their attributes for best usage as storage resources in the system, and defines various operational parameters selected from the group consisting of: storage unit types, storage unit names, quotas, limits (hard/soft), authentication credentials, tokens, and security mechanisms.

16. The system of claim 15 wherein the data change metric is a predicted value generated by an estimator component, and wherein the estimator component uses a comparison of a bitmap of the data with a historic bitmap of data from one or more previous backup operations to produce the predicted value.

17. The system of claim 16 further comprising a supervised learning model trained using historical data of the one or more previous backup operations to establish past data change metrics for corresponding backup operations involving the backup client and the storage target.

18. The system of claim 17 wherein the model utilizes an artificial intelligence (AI) based component comprising a data collection component, a training component, and an inference component, and contains historical information regarding data objects and clients of the network to continuously train a machine learning (ML) algorithm in a predictive process to identify data object attributes for backing up the data and employ a fitting algorithm to derive a data change metric to determine an optimal backup reschedule to minimize overloading the storage target.

* * * * *